United States Patent [19]

Nerad et al.

[11] Patent Number: 5,641,426
[45] Date of Patent: *Jun. 24, 1997

[54] LIGHT MODULATING DEVICE HAVING A VINYL ETHER-BASED MATRIX

[75] Inventors: Bruce A. Nerad, Oakdale, Minn.; George F. Vesley, Hudson, Wis.

[73] Assignee: Minnesota Mining and Manufacturing Company, St. Paul, Minn.

[*] Notice: The term of this patent shall not extend beyond the expiration date of Pat. No. 5,593,615.

[21] Appl. No.: 235,561

[22] Filed: Apr. 29, 1994

[51] Int. Cl.$^6$ .............................. C09K 19/52; F21V 9/00
[52] U.S. Cl. ............................ 252/299.01; 252/582
[58] Field of Search ........................... 252/299.01, 582

[56] References Cited

U.S. PATENT DOCUMENTS

| | | | |
|---|---|---|---|
| 3,731,986 | 5/1973 | Fergason | 359/52 X |
| 3,935,337 | 1/1976 | Taylor | 427/180 |
| 4,411,495 | 10/1983 | Beni et al. | 359/43 X |
| 4,435,047 | 3/1984 | Fergason | 359/52 X |
| 4,501,503 | 2/1985 | Buirley et al. | 379/162 |
| 4,556,289 | 12/1985 | Fergason | 359/52 X |
| 4,616,903 | 10/1986 | Fergason | 359/52 X |
| 4,671,618 | 6/1987 | Wu et al. | 359/52 X |
| 4,673,255 | 6/1987 | West et al. | 359/51 X |
| 4,685,771 | 8/1987 | West et al. | 359/46 X |
| 4,688,900 | 8/1987 | Doane et al. | 359/52 X |
| 4,699,470 | 10/1987 | McLaughlin et al. | 359/51 X |
| 4,707,080 | 11/1987 | Fergason | 359/52 X |
| 4,728,547 | 3/1988 | Vaz et al. | 428/1 |
| 4,749,261 | 6/1988 | McLaughlin et al. | 359/51 X |
| 4,789,858 | 12/1988 | Fergason et al. | 340/784 |
| 4,818,070 | 4/1989 | Gunjima et al. | 359/57 X |
| 4,834,509 | 5/1989 | Gunjima et al. | 359/51 X |
| 4,850,683 | 7/1989 | Kawaguchi et al. | 359/52 X |
| 4,869,847 | 9/1989 | Leslie | 252/299.01 |
| 4,888,126 | 12/1989 | Mullen et al. | 252/299.5 |
| 4,890,902 | 1/1990 | Doane et al. | 359/56 X |
| 4,891,152 | 1/1990 | Miller et al. | 252/299.5 |
| 4,911,536 | 3/1990 | Ditzik | 359/51 X |
| 4,938,568 | 7/1990 | Margerum et al. | 359/51 X |
| 4,944,576 | 7/1990 | Lacker et al. | 359/51 |
| 4,950,052 | 8/1990 | Fergason et al. | 359/52 X |
| 4,971,719 | 11/1990 | Vaz et al. | 252/299.5 |
| 4,992,201 | 2/1991 | Pearlman | 252/299.1 |
| 5,004,323 | 4/1991 | West et al. | 359/103 X |

(List continued on next page.)

FOREIGN PATENT DOCUMENTS

| | | |
|---|---|---|
| 0 205 261 | 12/1986 | European Pat. Off. . |
| 0313053 | 4/1989 | European Pat. Off. . |
| 0484972 | 5/1992 | European Pat. Off. . |
| 0 538 553 | 4/1993 | European Pat. Off. . |
| 0538553 | 4/1993 | European Pat. Off. . |
| 0 564 869 | 10/1993 | European Pat. Off. . |
| 61-305528 | 12/1986 | Japan . |
| 2310520 | 5/1989 | Japan . |
| 3017620 | 1/1991 | Japan . |
| 5113557 | 10/1991 | Japan . |

(List continued on next page.)

OTHER PUBLICATIONS

Vaz, *Mol. Cryst. Liq. Cryst.*, 146:17 (1987).
Drzaic, *Liq. Cryst.*, 5(5):1467 (1989).
Fuh et al., *J. Apply. Phys.*, 66(11) pp. 5273–5284 (1989).
van Konynenberg et al., SPIE vol. 1080, pp. 62–69 (1989).
Sutherland, SPIE vol. 1080, pp. 83–90 (1989).
Whitehead Jr. et al., SPIE vol. 1080, pp. 250–257 (1989).
van Konynenberg et al., SPIE vol. 823, pp. 143–150 (1987).
Drzaic, *J. Appl. Phys.*, 60(6):2142 (1986).

(List continued on next page.)

*Primary Examiner*—C. H. Kelly
*Attorney, Agent, or Firm*—Gary L. Griswold; Walter N. Kirn; Robert W. Sprague

[57] ABSTRACT

An optically responsive film that includes liquid crystal dispersed in a crosslinked polymer matrix that includes the reaction product of an isotropic polymerizable mixture that includes at least one vinyl ether.

18 Claims, 2 Drawing Sheets

U.S. PATENT DOCUMENTS

| | | | |
|---|---|---|---|
| 5,011,624 | 4/1991 | Yamagishi et al. | 252/299.5 |
| 5,021,188 | 6/1991 | Vaz et al. | 252/299.5 |
| 5,053,889 | 10/1991 | Nakano et al. | 358/480 |
| 5,056,898 | 10/1991 | Ma et al. | 359/94 |
| 5,087,387 | 2/1992 | Mullen et al. | 252/299.5 |
| 5,096,282 | 3/1992 | Margerum et al. | 359/3 |
| 5,116,528 | 5/1992 | Mullen et al. | 252/299.5 |
| 5,142,389 | 8/1992 | Fergason | 359/53 |
| 5,188,760 | 2/1993 | Hikmet et al. | 252/299.01 |
| 5,202,063 | 4/1993 | Andrews et al. | 264/4.6 |
| 5,211,876 | 5/1993 | Vaz et al. | 252/299.01 |
| 5,225,104 | 7/1993 | Van Steenkiste et al. | 252/299.01 |
| 5,268,783 | 12/1993 | Yoshinaga et al. | 359/103 X |
| 5,270,843 | 12/1993 | Wang | 359/52 |
| 5,286,408 | 2/1994 | Naemura et al. | 252/299.01 |
| 5,296,952 | 3/1994 | Takatsu et al. | 359/53 |
| 5,304,323 | 4/1994 | Arai et al. | 252/299.5 |
| 5,323,251 | 6/1994 | Coates et al. | 359/52 |
| 5,327,271 | 7/1994 | Takeuchi et al. | 359/75 |
| 5,342,545 | 8/1994 | Yamada | 252/299.01 |
| 5,344,587 | 9/1994 | Coates et al. | 252/299.66 |

FOREIGN PATENT DOCUMENTS

| | | |
|---|---|---|
| 5117532 | 11/1991 | Japan. |
| 5257134 | 12/1991 | Japan. |
| 5194955 | 1/1992 | Japan. |
| 216856 | 4/1992 | Japan. |
| 4136817 | 5/1992 | Japan. |
| 4156425 | 7/1992 | Japan. |
| 4240614 | 8/1992 | Japan. |
| 4328520 | 10/1992 | Japan. |
| 264520 | 11/1992 | Japan. |
| 4310921 | 11/1992 | Japan. |
| 2260141 | 7/1993 | United Kingdom. |
| WO85/04262 | 9/1985 | WIPO. |
| WO87/01822 | 3/1987 | WIPO. |
| WO93/12219 | 7/1992 | WIPO. |
| 92/12219 | 7/1992 | WIPO. |
| WO92/19695 | 12/1992 | WIPO. |
| WO93/05436 | 3/1993 | WIPO. |
| WO93/09202 | 5/1993 | WIPO. |
| WO93/18431 | 9/1993 | WIPO. |
| WO93/22397 | 11/1993 | WIPO. |
| WO93/24589 | 12/1993 | WIPO. |

OTHER PUBLICATIONS

Drzaic, *Liq. Cryst. Disp. & Appl.*, SPIE 1257:29 (1990).
Doane et al., *Appl. Phys. Lett.*, 48(4):269 (1986).
Smith et al., *Liquid Crystal*, 3(5):543 (1988).
Vaz, "*Polymer–dispersed Liquid Crystal Films: Materials and Applications*", SPIE 1080:2–10 (1989).
Vaz et al., "*A Light Control Film Composed of Liquid Crystal Droplets Dispersed in a UV–Curable Polymer*", Liq. Cryst. 1987, vol. 146, pp. 1–14.
Vaz et al., "*A Light Control Film Composed of Liquid Crystal Droplets Dispersed in Epoxy Matrix*", Mol. Cryst. Liq. Cryst., 1987, vol. 146, pp. 17–34.
Yamagishi et al., SPIE vol. 80, *Liquid Crystal Chemistry, Physics, and Applications*, pp. 24–31 (1989).
Yamaguchi et al., *J. Soc. Inf. Disp.*, 1(3):347 (1993).
Zhang et al., Proc. SPIE 1815:233 (1992).
Levy et al., *Materials Letters*, 10:470 (1991).
Levy et al., *J. Non–Cryst. Solids*, 147–48:646 (1992).
West et al., *Appl. Phys. Lett.*, 60(26) (1992).
West, *ACS Symp. Ser.*, 435:475 (1990).
Craighead et al., *Appl. Phys. Letter*, 40(1):22 (1982).
Doane et al., *Mol. Cryst. Liq. Cryst.*, 165:511 (1988).
West, *Mol. Cryst. Liq. Cryst. Inc. NonLin. Opt.*, 157:427 (1988).
Lackner et al., *Liq. Cryst. Chem. Phys. & Appl.*, SPIE 1080:53 (1989).
Montgomery, SPIE 958:104 (1988).
Hirai et al., SPIE 1257:2 (1990).
Nolen et al., *Mol. Cryst. Liq. Cryst. Lett.* 86(6):129, (1992).
Hikmet et al., *Advanced Materials* 4:679 (1992).
Hikmet et al., *Polymer* 34:1736 (1993).
Yang et al., *IEEE*, pp. 49–52 (1991).
Rout et al., *Jap. J. Appl. Phys.*, 30:L1412 (1991).
Coates, *Displays*, 14(2):94 (1994).
Gotoh et al., *Appl. Phys. Lett.*, 60(3):392 (1992).
Margerum et al., *Liquid Crystals*, 14(2):345 (1993).
Montgomery et al., *Mol. Cryst. Liq. Cryst. Sci. Technol.*, Sect. A., pp. 131–51 (1993).
Mucha, *J. Appl. Polym. Sci.*, 53(1):175 (1991).
Sato et al., *Jap. J. Appl. Phys.*, 32(5A):2025 (1993).

LIGHT MODULATING DEVICE HAVING A VINYL ETHER-BASED MATRIX

CROSS REFERENCE TO RELATED APPLICATIONS

This application is related to the following U.S. patent applications which are assigned to the same assignee as the present application and hereby incorporated by reference: (1) Miller et al., U.S. patent application Ser. No. 07/819,260, entitled "Polymer-Dispersed Liquid Crystal Device Having an Ultraviolet-Polymerizable Matrix and a Variable Optical Transmission and a Method for Preparing Same" filed Jan. 10, 1992, which is a continuation-in-part of Miller et al., U.S. patent application Ser. No. 07/640,034 filed Jan. 11, 1991, now abandoned; (2) Nerad et al., U.S. patent application Ser. No. 08/103,271, entitled "Light Modulating Device Having a Silicon-Containing Matrix" filed Aug. 6, 1993; (3) Nerad et al., U.S. patent application Ser. No. 08/235,101, entitled "Light Modulating Device Having a Matrix Prepared From Acid Reactants" filed concurrently with the present application; and (4) Vesley et al., U.S. patent application Ser. No. 08/235,561, entitled "Light Modulating Device Having a Matrix Prepared From Allyl Reactants" filed concurrently with the present application.

BACKGROUND OF THE INVENTION

1. Field of the Invention

This invention relates to a light modulating device (e.g., a polymer-dispersed liquid crystal device hereinafter referred to as a "PDLC device") and, more particularly, to a light modulating device which is based on an improved matrix that is the reaction product of a vinyl ether.

2. Description of the Related Art

Various types of light modulating devices are known. One type is the so-called PDLC device that includes an electrically responsive liquid crystal layer in which liquid crystal droplets are dispersed throughout a polymer matrix. One way to prepare the liquid crystal layer is by combining the liquid crystal material with a polymerizable matrix precursor and then subjecting the mixture to polymerization conditions. Polymerization causes phase separation of the liquid crystal material, resulting in the formation of liquid crystal droplets dispersed throughout the polymerized matrix.

PDLC devices are translucent in the absence of an electric field due to light scattering and become transparent upon application of the field. Reverse mode PDLC devices are also known. These devices are transparent in the absence of an electric field and become translucent upon application of the field.

Various PDLC matrices are known. They include the polymerization products of epoxy, isocyanate, and certain photo-curable vinyl monomers (e.g., acrylates or the reaction product of a multi-functional thiol with a multi-functional acrylate or a multi-functional allyl).

SUMMARY OF THE INVENTION

In a first aspect, the invention features an optically responsive film that includes liquid crystal dispersed in a crosslinked polymer matrix that includes the reaction product of an isotropic polymerizable mixture that includes at least one vinyl ether and at least one multi-functional reactant other than a vinyl ether.

A "vinyl ether" is a reactant having one or more polymerizable carbon-carbon double bonds linked via a single bond to an oxygen atom where the other group bonded to the oxygen atom is not a carbonyl group nor a hydrogen atom.

A "multi-functional" reactant is a reactant containing two or more groups that participate in the polymerization reaction by reacting with the carbon-carbon double bond(s) of the vinyl ether. A "mono-functional" reactant, in contrast, contains only one such group.

An "ene" is a reactant having a polymerizable carbon-carbon double bond.

By "isotropic" it is meant that the polymerizable mixture does not exhibit a liquid crystalline mesophase at the polymerization temperature prior to polymerization to prepare the optically responsive film.

In some preferred embodiments, the vinyl ether may be a multi-functional vinyl ether, mono-functional vinyl ether, or combination thereof. Specific examples of preferred vinyl ethers include hydroxybutyl vinyl ether or esters thereof (e.g., an ester of a dicarboxylic acid such as isophthalic acid, glutaric acid, or succinic acid); butanediol divinyl ether; 1,4-cyclohexanedimethanol monovinyl ether or esters thereof (e.g., an ester of a dicarboxylic acid such as isophthalic acid, glutaric acid, or succinic acid); 1,4-cyclohexanedimethanol divinyl ether; the propenyl ether of propylene carbonate; triethylene glycol divinyl ether; vinyl ether-functional urethane oligomers; and fluorinated vinyl ethers.

The multi-functional reactant may be a thiol, ene, silicon hydride, alcohol, epoxy, or combination thereof. In one preferred embodiment, the multi-functional reactant is a multi-functional thiol. Such thiols preferably have the general formula $Z[OCO(CH_2)_nSH]_m$ where Z is a polyvalent organic moiety which is a $CH_{0-3}$ group-containing nucleus of a tri- or tetravalent alcohol of the type of glycerol or pentaerythritol, m is 3 or 4, and n is an integer between 1 and 5, inclusive. Examples of preferred thiols include trimethylolpropane tris(3-mercaptopropionate), pentaerythritol tetra (3-mercaptopropionate), and combinations thereof.

A second example of a preferred multi-functional reactant is a multi-functional ene. Preferred multi-functional enes include multi-functional allyls, acrylates, methacrylates, acrylamides, methacrylamides, vinyl silanes, and combinations thereof.

In other preferred embodiments, the optically responsive film is the reaction product of the vinyl ether, the multi-functional reactant, and at least one mono-functional reactant other than a vinyl ether. Examples of preferred mono-functional reactants include mono-functional enes (e.g., allyls, acrylates, methacrylates, acrylamides, methacrylamides, vinyl silanes, maleates, fumarates, and combinations thereof), thiols, silicon hydrides, alcohols, epoxies, and combinations thereof. "Maleate" refers to a mono- and/or di-ester of maleic acid and/or maleic anhydride. "Fumarate" refers to a mono- and/or di-ester of fumaric acid and/or fumaric anhydride. Maleic acid and fumaric acid are the cis and trans forms, respectively, of butenedioic acid.

The optically responsive film may also be the reaction product of the vinyl ether, the multi-functional reactant, and at least one acid reactant. An "acid reactant" refers to a copolymerizable species provided with one or more groups classified as Lewis acids. Examples of preferred acid reactants include acrylic acid, methacrylic acid, and combinations thereof.

Specific examples of preferred optically responsive films include those films which are the reaction product of:

(1) a vinyl ether, a multi-functional allyl, and a multi-functional thiol;

(2) a vinyl ether, a multi-functional acrylate, and a multi-functional thiol;

(3) a vinyl ether, a multi-functional allyl, a multi-functional acrylate, and a multi-functional thiol;

(4) a vinyl ether, a multi-functional allyl, a multi-functional thiol, and at least one mono-functional acrylate, methacrylate, or combination thereof;

(5) a vinyl ether, a multi-functional allyl, a multi-functional acrylate, a multi-functional thiol, and at least one mono-functional acrylate, methacrylate, or combination thereof;

(6) a vinyl ether, a multi-functional thiol, and at least one mono-functional acrylate, methacrylate, or combination thereof;

(7) a vinyl ether, a multi-functional allyl, and at least one mono-functional acrylate, methacrylate, or combination thereof;

(8) a vinyl ether, a multi-functional thiol, a multi-functional acrylate, and at least one mono-functional acrylate, methacrylate, or combination thereof;

(9) a vinyl ether, a multi-functional acrylate, and at least one mono-functional acrylate, methacrylate, or combination thereof;

(10) a vinyl ether, a multi-functional allyl, and a multi-functional acrylate; and

(11) a vinyl ether, a multi-functional allyl, a multi-functional acrylate, and at least one mono-functional acrylate, methacrylate, or combination thereof.

The invention further features a light modulating device that includes the above-described optically responsive films to which an electric field is applied through a pair of electrodes.

In a second aspect, the invention features an optically responsive film that includes liquid crystal dispersed in a crosslinked polymer matrix that includes the reaction product of an isotropic polymerizable mixture that includes at least one multi-functional vinyl ether.

In preferred embodiments of the second aspect of the invention, the film is the reaction product of (a) the multi-functional vinyl ether and at least one mono-functional vinyl ether or (b) the multi-functional vinyl ether and at least one multi-functional reactant other than a vinyl ether which may be a thiol, ene, silicon hydride, alcohol, epoxy, or combination thereof. Examples of preferred multi-functional vinyl ethers include 1,4-cyclohexanedimethanol divinyl ether, triethylene glycol divinyl ether, and vinyl ether-functional urethane oligomers.

The optically responsive film may be the reaction product of the multi-functional vinyl ether and at least one mono-functional reactant other than a vinyl ether. Examples of mono-functional reactants include mono-functional thiols, enes (e.g., a mono-functional allyl, acrylate, methacrylate, acrylamide, methacrylamide, vinyl silane, or combination thereof), silicon hydride, alcohol, epoxy, or combination thereof). The film may also be the reaction product of the multi-functional vinyl ether and at least one acid reactant (e.g., acrylic acid, methacrylic acid, or combination thereof) or the reaction product of the multi-functional vinyl ether and a maleate, fumarate, or combination thereof.

The invention further features a light modulating device that includes the above-described optically responsive films to which an electric field is applied through a pair of electrodes.

In a third aspect, the invention features a method of preparing an optically responsive film that includes the steps of:

(a) combining liquid crystal and at least one vinyl ether to form a substantially homogeneous isotropic mixture; and (b) polymerizing the vinyl ether in the presence of the liquid crystal under reaction conditions selected to cause phase separation of the liquid crystal to form an optically responsive film that includes liquid crystal dispersed in a crosslinked polymer matrix.

In preferred embodiments of the third aspect of the invention, the vinyl ether is a multi-functional vinyl ether, a mono-functional vinyl ether, or combination thereof. The reactant mixture (i.e., the mixture of liquid crystal and vinyl ether) may further include a multi-functional reactant other than a vinyl ether, e.g., a thiol, ene, silicon hydride, alcohol, epoxy, or combination thereof. The reactant mixture may also further include at least one mono-functional reactant other than a vinyl ether (e.g., a mono-functional thiol, ene, silicon hydride, alcohol, epoxy, or combination thereof). Moreover, the reactant mixture may further include at least one acid reactant (e.g., acrylic acid, methacrylic acid, or combination thereof). The reactant may also further include a maleate, fumarate, or combination thereof.

The vinyl ether-based optically responsive films according to the invention offer several advantages. For example, the vinyl ethers can be cured either thermally or by exposure to radiation (e.g., ultraviolet or electron beam radiation). In addition, the polymerization reaction can be initiated and/or catalyzed cationically, free radically, or through a combination of both. The vinyl ethers cure rapidly but (in the case of cationic initiation) are not inhibited by atmospheric oxygen. Moreover, a variety of materials can be co-reacted with the vinyl ether, enabling the properties of the polymer matrix to be tailored for a particular application. The vinyl ethers are also less toxic than, e.g., acrylates.

Other features and advantages will be apparent from the following description of the preferred embodiments thereof and from the claims.

BRIEF DESCRIPTION OF THE DRAWINGS

The invention will be more fully understood with reference to the following drawings in which.

DESCRIPTION OF THE PREFERRED EMBODIMENTS

Figure 1:
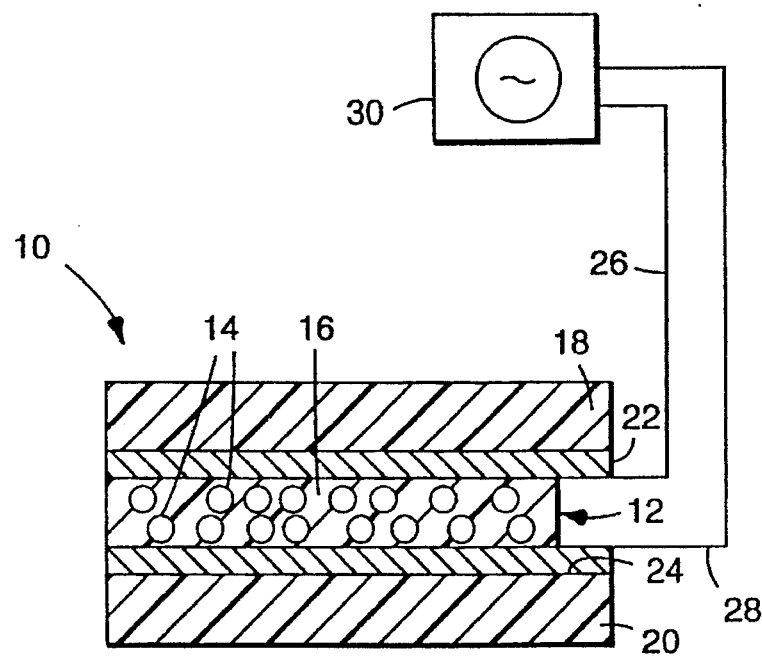
FIG. 1 is a schematic view, partially in cross-section, of a light modulating device according to the invention.

Referring to FIG. 1, there is shown a light modulating device 10 comprising an optically responsive film 12 having a multiplicity of discrete liquid crystal droplets 14 having diameters in the range from about 0.1 to 10 times the wavelength of light to be scattered dispersed in a crosslinked polymeric matrix 16 that is the polymerization product of one or more vinyl ethers.

The vinyl ethers may be mono-functional, multi-functional (i.e., having two or more polymerizable vinyl ether moieties), or a combination thereof. Examples of suitable vinyl ethers include hydroxy butyl vinyl ether (HBVE, commercially available from International Specialty Products, Wayne, N.J.); 1,4-cyclohexanedimethanol divinyl ether (CHVE, commercially available from International Specialty Products, Wayne, N.J.); propenyl ether of propylene carbonate (PEPC, commercially available from International Specialty Products, Wayne, N.J.); triethylene glycol divinyl ether (DVE-3, commercially available from International Specialty Products, Wayne, N.J.); butanediol divinyl ether (commercially available from BASF, Parsippany, N.J.); vinyl ethers commercially available from Allied-Signal Corp., Morristown, N.J. under the tradename "Vectomer" (e.g., Vectomer 2010, 2020, 4010, and 4020); vinyl ether-maleate mixtures commercially available from DSM Resins U.S., Inc., Elgin, Ill. under the tradename "Uralac" (e.g., Uralac 3004-102 and 3004-300); and fluorinated vinyl ethers (e.g., $C_8F_{17}SO_2N(C_2H_5)CH_2CH_2OCH=CH_2$ prepared according to the procedure described in U.S. Pat. No. 3,078,245, hereby incorporated by reference).

The vinyl ethers may be used alone or, more preferably, co-reacted with one or more multi-functional reactants and/or one or more mono-functional reactants. Examples of materials with which the vinyl ethers can be polymerized to form matrix 16 fall into the following classes.

(1) Class I includes mono-functional and multi-functional non-vinyl ether enes such as acrylates, methacrylates, allyls, acrylamides, methacrylamides, vinyl silanes, maleates, fumarates, or combinations thereof.

Examples of mono-functional acrylates and methacrylates include acrylate and methacrylate esters of non-tertiary alkyl alcohols, the molecules of which have from 1 to about 14 carbon atoms. Included within this class of matrix reactants, are, for example, isooctyl acrylate, isononyl acrylate, 2-ethylhexyl acrylate, decyl acrylate, dodecyl acrylate, n-butyl acrylate, hexyl acrylate, isooctyl methacrylate, and lauryl methacrylate.

Examples of multi-functional acrylates and methacrylates include 1,6-hexanedioldiacrylate, trimethylpropane triacrylate, propylene glycol dimethacrylate, pentaerythritol tetraacrylate, and 1,2-ethylene glycol diacrylate.

Examples of mono- and multi-functional allyls include mono-, di-, and triallyl compounds and allyl compounds containing an hydroxyl group reacted with a mono- or multi-functional isocyanate, e.g., triallyl isocyanurate, trimethylolpropane diallyl ether, allyl benzene, allylcyclohexane, diallyldiphenylsilane, and allyl-functional oligomers such as 9460 commercially available from Monomer-Polymer & Dajac Laboratories, Inc., Trevose, Pa.

Examples of mono-functional acrylamides and methacrylamides include N,N-dimethylacrylamide, N,N-diethylacrylamide, N-dodecylmethacrylamide, and N-ethylmethacrylamide.

Examples of multi-functional acrylamides and methacrylamides include 1,6-hexamethylenebisacrylamide, N,N',-octamethylene-bisacrylamide, 1,6-hexamethylenebismethacrylamide, N,N-iso-valerylidene-bis-methacrylamide, and m-xylene-bisacrylamide.

Examples of mono-functional vinyl silanes include vinyltrimethylsilane, vinyltrimethoxysilane, vinyltris(trimethylsiloxy) silane, and siloxanes such as that commercially available from Hüls America under the trade designation "PS408."

Examples of multi-functional vinyl silanes include trivinylmethylsilane, 1,3-divinyltetramethyldisiloxane, 1,3-divinyl-1,3-diphenyl-dimethyldisiloxane, divinyldimethylsilane, divinyldiphenylsilane, 1,1,3,3-tetravinyldimethyldisiloxane, tetravinylsilane, and 1,3,5,7-tetravinyltetramethylcyclotetrasiloxane.

Also suitable are ene-functional siloxanes such as acryloyl-functional siloxanes (e.g., 1,3-bis[(p-acryloxymethyl)phenylethyl]tetramethyldisiloxane); methacryloyl-functional siloxanes (e.g., 1,3-bis(3-methacryloxypropyl)tetramethyldisiloxane and siloxanes such as that commercially available from Hüls America under the trade designation "PS406"); allyl-functional siloxanes (e.g., the hydrolysis product of allyldimethylchlorosilane); vinyl-functional siloxanes (e.g., 1,3-divinyltetramethyldisiloxane, 1,3-divinyl-1,3-diphenyl-dimethyldisiloxane, 1,1,3,3-tetravinyldimethyldisiloxane, and 1,3,5,7-tetravinyltetramethylcyclotetrasiloxane); and hexenyl-functional siloxanes (e.g., 1,3-bis(6-hex-1-enyl) tetramethyldisiloxane, which is the hydrolysis product of 6-hex-1-enyldimethylchlorosilane)

Also useful are allyl or (meth)acrylated oligomers of polyurethanes, polyesters, polyols, alkylene oxides, polybutadienes, or epoxies. An example of a suitable acrylated polybutadiene is SARTOMER CD 5000 (commercially available from Sartomer Co.). A useful acrylated polyester is SARTOMER 609 (from Sartomer Co.) and a suitable acrylated polyurethane is SARTOMER 9610 (Sartomer Co.). Other useful acryl oligomers include those sold under the trade name "Ebecryl" by Radcure Specialties and the trade name "Photomer" from Diamond Shamrock.

(2) Class II includes multi- and mono-functional thiols. Examples of suitable mono-functional thiols include isooctyl 3-mercaptopropionate. Preferred multi-functional thiols have the general formula $Z[OCO(CH_2)_nSH]_m$ where Z is a polyvalent organic moiety which is a $CH_{0-3}$ group-containing nucleus of a tri- or tetravalent alcohol of the type of glycerol or pentaerythritol, m is 3 or 4, and n is an integer between 1 and 5, inclusive. Specific examples include trimethylolpropane tris(3-mercaptopropionate) and pentaerythritol tetra(3-mercaptopropionate).

Also useful are mercapto-functional siloxanes (e.g., poly (3-mercaptopropylmethylsiloxane), or oligomers or copolymers thereof; 1,1,3,3,-tetramethyl-1,3-bis(3-mercaptopropyl)disiloxane; and siloxanes such as that commercially available from Hüls America under the trade designation "PS405").

The thiols may be included as part of UV polymerizable systems based on thiol-ene chemistry in which one or more multi- or mono-functional enes (e.g., a mono- or multi-functional allyl, acrylate, methacrylate, or combination thereof) reacts with the thiol. Commercially available materials based upon thiol-ene chemistry include NOA 65 and NOA 68, each of which includes a photoinitiator and is available from Norland Products, Inc. New Brunswick, N.J., and compositions commercially available under the trade designation RCC-15C, RCC-15D, RCP-611, and WCC-2B from W. R. Grace & Co., Atlanta, Ga.

(3) Class III includes multi- and mono-functional silicon hydrides. Examples of suitable mono-functional silicon hydrides include trimethylsilane and dimethylphenylsilane. Examples of suitable multi-functional silicon hydrides include dimethylsilane, diphenylsilane, and methylphenylsilane. Also suitable are hydrosiloxanes (e.g., 1,1,3,3-tetramethyldisiloxane; 1,3,5,7,9-pentamethylcyclopentasiloxane; phenyltris(dimethylsiloxy) silane; and 1,3,5,7-tetramethylcyclotetrasiloxane).

(4) Class IV includes multi- and mono-functional alcohols. Examples of suitable multi-functional alcohols include those having molecular weights between 200 and 3000 g/mol, e.g., polyethylene oxide diols commercially available from Aldrich Co., Milwaukee, Wis.; diols commercially available under the trade designation "Terathane" from E. I. du Pont de Nemours & Co., Wilmington, De.; and "Tone 0201" commercially available from Union Carbide, Danbury, Conn. Examples of suitable mono-functional alcohols include 1-octanol, 1-decanol, and 1-dodecanol. Also useful are carbinolfunctional siloxanes (e.g., 1,3-bis(4-hydroxybutyl)tetramethyldisiloxane and 1,3-bis (hydroxypropyl)tetramethyldisiloxane).

(5) Class V includes epoxies. Examples of suitable epoxies include Bostik 7575 commercially available from Emhart Chemical Group and Epon 828 commercially available from Shell Oil Co. Also useful are epoxy-functional siloxanes (e.g., 1,3-bis(glycidoxypropyl) tetramethyldisiloxane).

To enhance the T-peel adhesion of optically responsive film 12, one or more copolymerizable acid reactants may copolymerized with the vinyl ether as described in the aforementioned Nerad et al., "Light Modulating Device Having a Matrix Prepared From Acid Reactants" application. Examples of suitable acid reactants include unsaturated carboxylic acids (e.g., acrylic acid, methacrylic acid, crotonic acid, vinyl acetic acid, itaconic acid, maleic acid, fumaric acid, allylacetic acid, cinammic acid, and unsaturated acid-terminated polyester oligomers); mono-esters of unsaturated dicarboxylic acids (e.g., mono-esters of maleic and fumaric acid); hydroxy-functionalized carboxylic acids (e.g., 4-hydroxybenzoic acid); mercapto-functionalized carboxylic acids (e.g., 3-mercaptopropionic acid); and sulfonic acids (e.g., hydroxybenzenesulfonic acid and sulfanilic acid). The amount of acid reactant preferably is not so high as to yield a brittle inflexible film with a relatively low T-peel strength and/or a film with a high degree of memory (as defined below).

Matrix reactants falling within any particular class may be used in combination with each other or in combination with materials in the other classes. The particular choice of matrix reactant (or combination thereof) will depend upon the desired physical characteristics of the final film. For example, the matrix reactants may be chosen such that the refractive index of the polymerized matrix (including dissolved liquid crystal) matches the ordinary index of refraction ($n_o$) of the liquid crystal material. In addition, if the vinyl ether reactant(s) is co-reacted with any of the aforementioned classes of matrix reactants, e.g., alcohols, then other compounds that react only with the co-reactant, e.g., isocyanates, may be used.

In choosing the amounts and identities of matrix reactants, several criteria generally apply. First, it is desirable to choose matrix reactants to adjust polymerization rate (and thereby optimize, e.g., haze, switching voltage, and droplet structure of the PDLC film 12, as well as allow the use of lower liquid crystal contents). For example, allyls, vinyl silanes, vinyl ethers without maleates, and methacrylates tend to homopolymerize free-radically very slowly and therefore should preferably be used in combination with co-reactants that sustain and increase the polymerization rate. Such a combination will allow a high degree of conversion to be reached in a reasonable length of time. Examples of such co-reactants include acrylates, acrylamides, vinyl ether/maleate mixtures, and thiols. However, the amount of thiol is preferably limited (e.g., not to exceed about 20% by weight) and/or the functionality of the thiol is preferably high to avoid production of a relatively low molecular weight matrix and/or a matrix having a relatively low degree of crosslinking. This is because thiols are chain transfer agents that can terminate propagating polymer chains; moreover, thiols do not readily homopolymerize. In addition, when a relatively high percentage of slow-reacting reactants (e.g., allyls, vinyl silanes, or methacrylates) is used, the slow-reacting reactants preferably should have relatively large equivalent weights (e.g., oligomers) and the rate sustaining co-reactants should be of relatively low equivalent weight (e.g., monomers).

A second criterion relates to the functionality of the reactants. Specifically, it is desirable that at least some of the vinyl ether reactants and/or some of the ene reactants are multi-functional in order to produce a crosslinked matrix. Crosslinking increases the resistance to damage caused by extreme temperatures and further reduces "memory." "Memory" refers to the change in zero-volt opacities before and after the device has been powered. Generally, the opacity difference (and thus the contrast between the on- and off-states) is greatest the first time the PDLC device is operated. On the other hand, too high a crosslinking level is undesirable because it shifts the switching voltage to higher voltages. The amount of multi-functional reactant(s) required will depend upon the structure and functionality of the particular reactant(s). Low molecular weight and/or high functionality (i.e., low equivalent weight) reactants (e.g., hexanediol diacrylate) and reactants with more rigid backbones between functional groups (e.g., 1,4-cyclohexanedimethanol divinyl ether) are preferably used at lower levels than flexible and/or high equivalent weight reactants (e.g., triethylene glycol divinyl ether). In addition, polar mono-functional reactants such as acrylic and methacrylic acid act as weak crosslinkers through hydrogen bonding.

It has also been found that optical properties such as haze can be minimized by optimizing the refractive index of the matrix reactants relative to that of the liquid crystal material. For example, it has been found that optimizing the relative levels of isooctyl acrylate and 2-phenoxyethyl acrylate (i.e., replacing some of the isooctyl acrylate with 2-phenoxyethyl acrylate, or vice-versa), minimizes haze in the powered PDLC device.

The following combinations are specific examples of useful matrix combinations:

(a) RCC-15C obtained without initiator and with 50% less thiol (W. R. Grace & Co.), isooctyl acrylate, acrylic acid, triethylene glycol divinyl ether, and 2-phenoxyethyl acrylate;

(b) isooctyl acrylate, Vectomer 2010 (Allied-Signal Corp.; vinyl ether oligomer), Uralac 3004-102, acrylic acid, and trimethylolpropane tris(3-mercaptopropionate);

(c) isooctyl acrylate, Vectomer 2020 (Allied-Signal Corp.; vinyl ether oligomer), acrylic acid, Uralac 3004-102, 2-phenoxyethyl acrylate, and trimethylolpropane tris (3-mercaptopropionate);

(d) isooctyl acrylate, Vectomer 2020, acrylic acid, 1,4-cyclohexane dimethanoldivinyl ether, 2-phenoxyethyl acrylate, and trimethylolpropane tris(3-mercaptopropionate);

(e) isooctyl acrylate, Uralac 3004-300 (DSM Resins USA, Inc.; vinyl ether/maleate oligomer), acrylic acid, Uralac 3004-102, and trimethylolpropane tris(3-mercaptopropionate);

(f) isooctyl acrylate, Uralac 3004-300, acrylic acid, 2-phenoxyethyl acrylate, and Uralac 3004-102;

(g) isooctyl acrylate, Vectomer 4010 (Allied-Signal Corp.; vinyl ether monomer), methacrylic acid, 2-phenoxyethyl acrylate, and Uralac 3004-102;

(h) isooctyl acrylate, lauryl methacrylate, Vectomer 4020 (Allied-Signal Corp.; vinyl ether monomer), methacrylic acid, 2-phenoxyethyl acrylate, and Uralac 3004-102;

(i) isooctyl acrylate, 9460 (Monomer-Polymer & Dajac Laboratories, Inc.; allyl-functional oligomer), acrylic acid, 2-phenoxyethyl acrylate, and Uralac 3004-102; and (j) isooctyl acrylate, Vectomer 2020, acrylic acid, 2-phenoxyethyl acrylate, Uralac 3004-102, and diethyl fumarate.

Liquid crystal materials useful in forming the droplets 14 may be nematic or cholesteric. Furthermore, they may have either positive or negative dielectric anisotropy. Particularly preferred (in the case of light modulating devices for automotive and architectural applications) are nematic liquid crystal materials having positive dielectric anisotropy. Commercially useful examples of such liquid crystal materials include LICRISTAL E7, BL006, BL009, ML1005, ML1008, 17151, 17153, 17315, 17722 (sometimes available under the trade designation BL038), and 17723 (sometimes available under the trade designation BL036), all of which are available from EM Industries, Hawthorne, N.Y. Mixtures of these liquid crystal materials may also be used. Low birefringence liquid crystal mixtures may be used as well, e.g., to provide a wider viewing angle.

Formation of an optically responsive film according to the invention is typically carried out in a phase separation process. Polymerization induced-phase separation has been found to be useful when the uncured polymer matrix material is miscible with a low molecular weight liquid crystal material. Liquid crystal droplets form when the solubility of the liquid crystal material in the polymer matrix material decreases as a result of an increase in the molecular weight of the matrix material that occurs when the matrix material polymerizes to form a continuous phase. As the solubility of the liquid crystal material decreases, it phase separates from the polymer matrix material and forms droplets. The droplets increase in size and/or purity until the polymer matrix material locks in the final droplet morphology. The polymerization is carried out in the presence of the liquid crystal material, thereby enabling tailoring of the polymer matrix in terms of molecular weight, crosslink density, liquid crystal compatibility, and/or adhesion.

Although many polymer matrix material/liquid crystal combinations according to the invention form miscible mixtures at room temperature, in others it may be necessary to heat the combination slightly to form a homogeneous solution and prevent premature phase separation.

Matrix 16 can be prepared by thermal-initiated polymerization of the polymer matrix material or, more preferably, by photo-initiated polymerization of the polymer matrix material using low intensity UV radiation. Generally, the amount of photoinitiator is from about 0.01 part to about 10 parts per 100 parts of polymer matrix material by weight. Useful photoinitiators and/or catalysts may be of the free radical or cationic type. Examples of suitable free radical photoinitiators include the benzoin ethers, substituted benzoin ethers such as benzoin methyl ether or benzoin isopropyl ether, substituted acetophenones such as 2,2-diethoxyacetophenone, and 2,2-dimethoxy-2-phenyl-acetophenone, substituted alpha-ketols such as 2-methyl-2-hydroxypropiophenone, aromatic sulphonyl chlorides such as 2-naphthalene sulphonyl chloride, and photoactive oximes such as 1-phenyl-1,1-propanedione-2-(O-ethoxycarbonyl) oxime. Other suitable free radical polymerization initiating systems which may be used to effect the polymerization include 2,4-bistrichloro-methyl-6-substituted-s-triazines, and benzophenone with an amine, for example, benzophenone and p-(N,N-diethylamino) ethyl benzoate. Examples of cationic photocatalysts for effecting polymerization include 'onium salts (e.g., diphenyl iodonium hexafluorophosphate and triphenyl sulfonium hexafluoroantimonate) and Lewis acid catalysts (e.g., cyclopentadienyl iron xylene hexafluorophosphate). Sensitizers such as phenanthrene may be used in conjunction with the photocatalysts and/or photoinitiators as well.

Low intensity UV lamps with different spectral responses are commercially available and may be used. The lamp should be selected such that the maximum output of the lamp is near the maximum absorption of the initiator. Fluorescent lamps (e.g., F40T12-350BL lamps commercially available from Osram Sylvania, Danvers, Mass.) in which the intensity of each lamp bank is in the range of about 0.25 to 10 mW/cm$^2$ (more preferably in the range of about 0.5 to 5 mW/cm$^2$) are suitable for this application. The total radiation to which the polymer matrix material is exposed preferably is in the range of about 100 to 1500 mJ/cm$^2$. The particular radiation intensity and total energy exposure requirements will vary depending on the liquid crystal, initiator, and polymer matrix materials.

Preferably, the liquid crystal material and the polymer matrix material are provided in approximately equal parts by weight, although the parts by weight of the liquid crystal material can vary from 10–90% by weight, even more preferably from 25–75% by weight. The optimum liquid crystal content is within 5% by weight of the concentration in which a further 5% by weight increase in liquid crystal content would yield a film in which the color of transmitted white light would change from slightly red to white.

Referring again to FIG. 1, although the optically responsive film 12 may be provided in free-standing form, in many applications it will be desirable to provide a sandwichlike construction in which the film 12 is interposed between a pair of first and second substrates 18 and 20, respectively. The thickness of the film preferably ranges from about 5 to 25 microns, more preferably in the range of about 10 to 25 microns, and most preferably in the range of about 15 to 21 microns. It will be understood that the device 10 may be provided with only a single substrate if, for example, the device is to be applied to a motor vehicle sunroof or an architectural window in which case the sunroof or the window have a function analogous to that of the second substrate.

At least one of the substrates 18 and 20 is at least partially transparent to allow incident visible light to pass therethrough. One of the substrates (preferably the one which light first impinges) may be modified to have selective light transmission characteristics, for example, to selectively transmit light of a wavelength corresponding to a certain color of the visible spectrum, ultraviolet light, or infrared light. Materials suitable for the substrates 18 and 20 include glass (which may be tempered) and plastics such as polyethylene terephthalate, polyethylene naphthalate, or other polyester or copolyester materials, polyethersulfone, polyimide, poly(methyl methacrylate), and polycarbonate. The substrates may be treated so as to enhance their abrasion and scratch resistance. The substrates are typically about 25 to 50 microns thick for flexible, durable constructions, although they may range in thickness from 1 microns to greater than 250 microns. If glass is employed for at least one of the substrates, the thickness may be in excess of 250 microns.

With continued reference to FIG. 1, in order to induce a change in the orientation of the liquid crystal droplets so as to cause the optically responsive film 12 to switch between the translucent off-state and the transparent on-state, it is necessary to apply an electric field across the film 12 (the film 12 may also be switched by applying a magnetic field across the same or by raising the temperature of the film above the clearing point temperature of the encapsulated liquid crystal). Accordingly, the device 10 may further comprise first and second electrodes 22 and 24, respectively, which are positioned intermediate the substrates 18 and 20 and the optically responsive film 12. The electrodes 22 and 24 are connected to, respectively, first and second leads 26 and 28 (e.g., using the connector described in Engfer et al., U.S. Ser. No. 08/011,973 entitled "Electrical Connector" filed Feb. 1, 1993 filed concurrently with the present application, assigned to the same assignee as the present application, and hereby incorporated by reference) which, in turn, are electrically connected to a variable power supply 30, preferably of the alternating current type (e.g., a zero-cross power supply). Preferably, the frequency of the alternating field should be in the range of 40 to 100 Hz. The field should alternate sufficiently rapidly so that a human observer of the device cannot perceive flickering. Thus, upon application of an electric field across the film 12, the optic axes of the liquid crystal droplets become aligned. If the refractive indices of the liquid crystal material and the polymer matrix have been closely matched, the film 12 will switch between the translucent off-state and the transparent on-state.

The electrodes 22 and 24 may be formed of various materials including chromium, indium oxide, tin oxide, stainless steel, indium tin oxide, gold, silver, copper, aluminum, titanium, cadmium stannate, transition metal oxides, and mixtures and alloys thereof. With the use of oxidizable electrode materials (e.g., silver) it may be desirable to environmentally protect the same with a thin passivating dielectric layer. The use of such a protective layer may enhance the ability of the electrode to resist thermal, chemical, moisture and/or ultraviolet-induced degradation such as is disclosed in Gilbert et al., U.S. patent application Ser. No. 07/819,274 entitled "Light Modulating Devices Incorporating an Improved Electrode" filed Jan. 10, 1992, which is assigned to the same assignee as the present application and hereby incorporated by reference. The electrodes must be capable of receiving an electrical input from the leads 26 and 28 and transmitting the same so as to apply an electric field across the film 12. Preferably the electrodes 22 and 24 are positioned adjacent to opposite sides or surfaces of the film 12 and extend over, across and parallel to the same.

At least one of the electrodes 22 and 24 preferably is at least partially transparent to visible light, although electrodes which provide preferential light transmission characteristics, such as color tint or ultraviolet or infrared filter, may be used. The electrodes 22 and 24 need not be equally transparent. At least one of the electrodes should provide a visible light transmission of at least 1%, preferably at least 10%, and more preferably at least 50%. The electrode coating should have a conductivity greater than 0.001 mhos per square. The electrode material may be coated or otherwise applied to the first and second substrates 18 and 20. Where only one of the substrates and one of the electrodes is transparent, the transparent substrate and transparent electrode should be on the same side of the device.

In operation, a user of the device 10 applies an electric field across the film 12 using power supplied by power supply 30, thereby rendering the device transmissive to light.

Whether the light modulating device is supplied as a free-standing film, with one substrate, or with two substrates, the device may be applied to a surface such as a motor vehicle sunroof, a motor vehicle side window, or an architectural window with, for example, suitable adhesive; preferably, the adhesive is optically transparent. As the device switches between the translucent off-state and the transparent on-state (in the case of nematic liquid crystal material having positive dielectric anisotropy), the device preferably has a uniform, even appearance.

The invention will be more fully understood with references to the following examples which are not to be construed as limiting the scope of the invention.

EXAMPLES

The following examples describe the preparation of light modulating devices based upon optically responsive PDLC films. In Examples 12–23 the device was prepared by first degassing an unpolymerized composition of matrix reactant (s) and liquid crystal and then pumping the composition to a coating die through which the composition was extruded onto the electrode side of an approximately 51 micron thick indium-tin oxide (ITO)-coated polyester film (90/10 indium/tin, 80 ohms/square, commercially available from Southwall Technologies, Palo Alto, Calif.) according to the process described in greater detail in Vesley et al., U.S. patent application Ser. No. 08/235,423 entitled "Precision Coating Process for Preparing Polymerizable Films" filed concurrently with, and assigned to the same assignee as, the present application, and hereby incorporated by reference.

Figure 2:
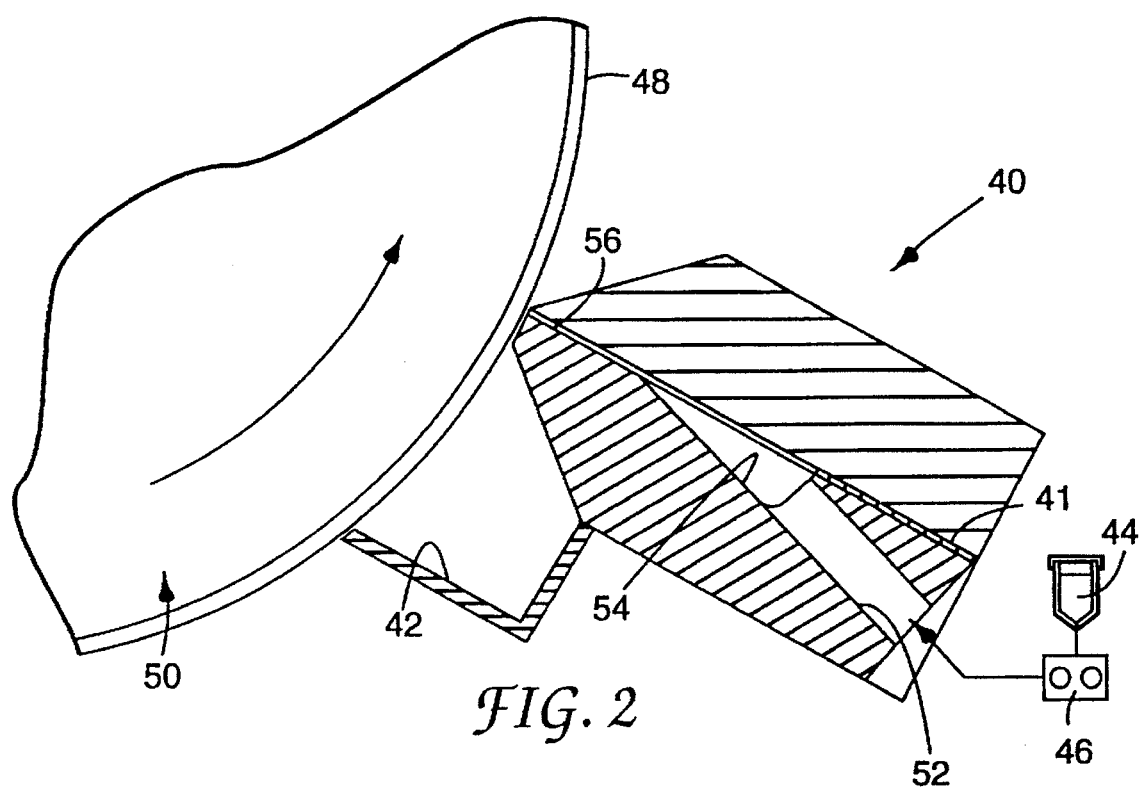
FIG. 2 is a cross-sectional view of an extrusion die useful in preparing films according to the invention.

The coating die 40 is shown in FIG. 2. The unpolymerized composition 44 was supplied by a pump 46 to the die 40 for application in the form of a continuous coating bead to the moving ITO-coated polyester film 48, supported by a backup roll 50. The backup roll 50 was a pacer roll driven by a Torquer Tachometer precision motor (available from Inland Motor Division, Bradford, Va.). The temperatures of the die and backup roll were controlled by circulating a temperature controlled fluid through them. Where indicated in the examples, vacuum was applied to vaccum chamber 42 to stabilize the coating bead. The unpolymerized composition 44 was supplied through a channel 52 to a manifold 54 for distribution through a slot 56 and coating onto the moving film 48. The height of slot 56 was controlled by means of a U-shaped shim 41 (typically made of brass or stainless steel).

Figure 3:
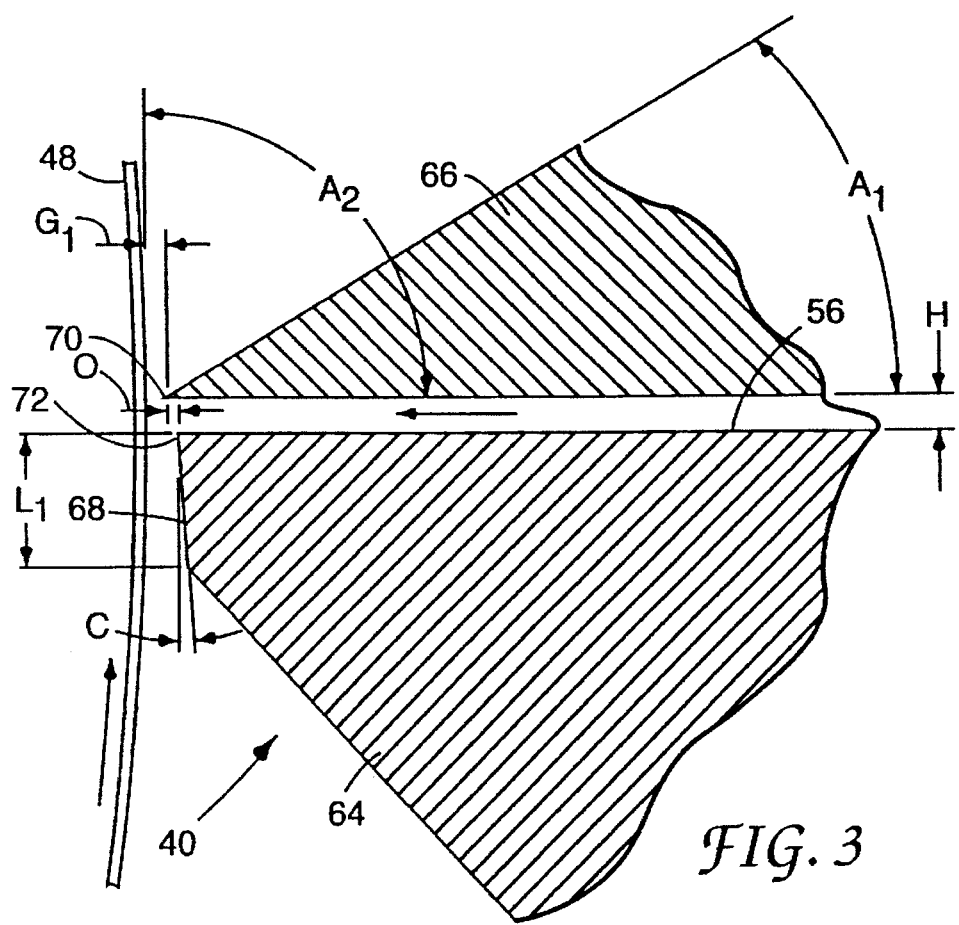
FIG. 3 is an enlarged cross-sectional view the extrusion die shown in FIG. 2.

Referring to FIG. 3, die 40 consisted of an upstream bar 64 and a downstream bar 66. The lip of the upstream bar was formed as a curved land 68 and the lip of the downstream bar was formed as a substantially straight sharp edge 70 having an edge radius no greater than 10 microns. The radius of the curved land 68 was equal to the radius of the backup roll 50 plus a minimal, and non-critical, 0.13 mm allowance for coating gap and film thickness.

The length $L_1$ of the curved land 68 on the upstream bar 64 was 12.7 mm and the length $L_2$ of land 82 was 12.7 mm. The edge angle $A_1$ of the downstream bar 66 was 50°–60°. The die attack angle $A_2$ between the downstream bar 66 surface of the coating slot 56 and the tangent plane P through a line on the film 48 surface parallel to, and directly opposite, the sharp edge 70 was 95°.

The coating gap $G_1$ is the distance between the sharp edge 70 and the film 48. Slot height H is the distance between upstream bar 64 and downstream bar 66, and was controlled by controlling the thickness of shim 41. The slot height used in the examples was 0.152 mm. Overbite O is a positioning of the sharp edge 70 of the downstream bar 66, with respect to the downstream edge 72 of the curved land 68 on the upstream bar 64, in a direction toward the film 48.

Convergence C is a counterclockwise, as shown in FIG. 3, positioning of the curved land 68 away from a location parallel to the film 48, with the downstream edge 72 being the center of rotation. In the examples, convergence was 0.57°.

Vacuum land gap $G_2$ was 152 microns.

Figure 4:
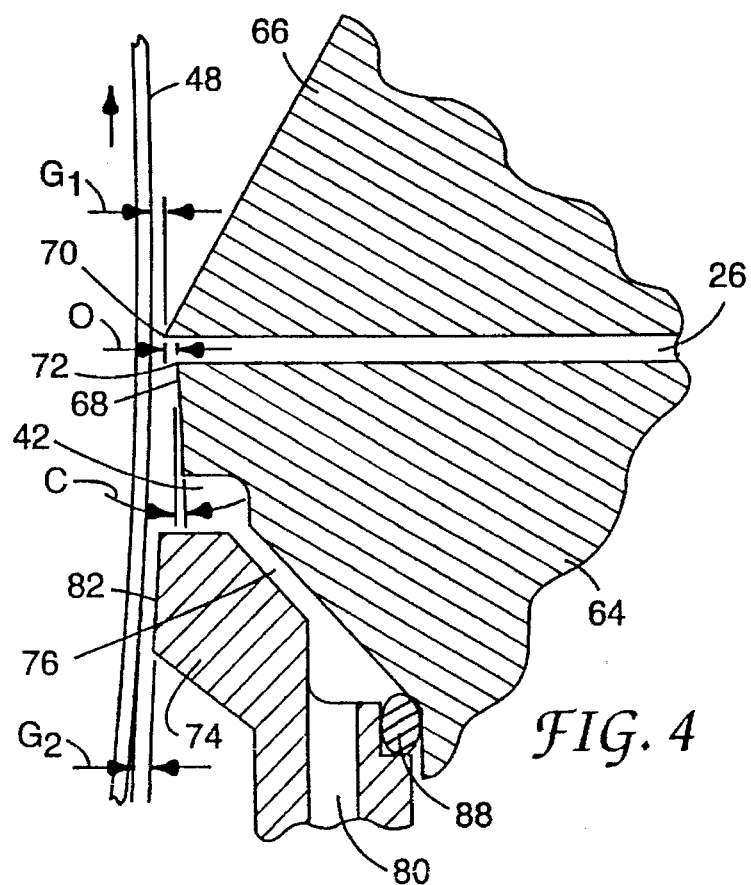
FIG. 4 is a cross-sectional view of an alternative extrusion die useful in preparing films according to the invention.

FIG. 4 is cross-sectional view of the extrusion die used to prepare films according to the invention and shows an alternate configuration where the vacuum bar 74 is isolated from the bottom die bar 65 by a flexible metal seal 88. This configuration allows adjustment of the coating gap $G_1$ and convergence C without affecting the vacuum land gap $G_2$.

The width of the coating produced by a given die was reduced where indicated by "deckling" the die and the vacuum chamber by concurrently incorporating a) shaped plugs to reduce the widths of the die cavity manifold 54 and vacuum chamber 42 to the deckling width and b) a shim into the die that has a shim slot width corresponding to the deckling width.

A second ITO-coated polyester film was unwound from a second unwind roll and passed around a 2.54 cm diameter sintered metal laminator bar where the second film was laminated to the coated face of the first film according to the procedure described in Vesley et al., U.S. patent application Ser. No. 08/235,366, entitled "Lamination Process for Coating" filed concurrently with, and assigned to, the same assignee as the present application, and hereby incorporated by reference. The laminator bar was located approximately 12 cm downstream from the backup roll such that the coated film was not in contact with the backup roll or other idler or takeup rolls at the point of lamination, and positioned so that the uncoated first substrate was depressed below the plane defined by the first film as it passed over the backup roll and the idler roll; the extent of depression is hereinafter referred to as "interference." Air pressure (approximately 2.4 bar) through the air bar laminator was adjusted to provide a cushion of air between the air bar laminator and the second film.

The uncured laminate construction was cured by passing the construction through a cooled curing chamber constructed of ultraviolet transparent Acrylite™ OP-4 (available from Cyro Industries, Mt. Arlington, N.J.), extending approximately 61 cm (2 feet) into a cure chamber equipped with two banks of fluorescent black lights (F20T12-350BL, available from Osram Sylvania, Danvers, Mass.), one bank positioned on each side of the laminate. Air temperature in the cooling chamber was monitored by a thermocouple mounted in the chamber under the second fluorescent bulb and controlled at the indicated temperature by introducing temperature controlled air. Each side of the laminate construction was exposed to approximately 250–600 mJ/cm$^2$ of radiation calculated from light intensities measured through a conductive electrode using a UVIBRITE radiometer (model number UBM365MO, available from Electronic Instrumentation and Technology, Inc., Sterling, Va.) equipped with a glass filter responsive between 300 and 400 nm, with a maximum transmission at 365 nm. The radiometer was specially calibrated to read in absolute intensity.

In the case of Examples 1–9, the devices were prepared using a modified version of the procedure described in the aforementioned Miller et al. application. A puddle of unpolymerized liquid crystal/matrix composition was placed on the moving surface of an ITO-coated polyester film measuring 51 microns thick just prior to the nip gap of the precision coater, where a second ITO-coated PET film entered to form a laminate in which the ITO-coated surfaces were in a facing relationship. The temperature of the nip rolls was maintained at 27° C. by circulating a cooling solution from a constant temperature bath through the rolls. The nip gap was typically set between 0.11–0.14 mm to accommodate the thickness of the electrode materials and to allow for the desired PDLC matrix thickness.

After exiting the nip rolls, the sandwichlike construction was cured by transporting it into a temperature-controlled cure chamber where it was irradiated with long wavelength UV light for approximately 3 minutes. The intensity of the UV light was measured by a EIT UVIBRITE radiometer model number UBM365MO as described above.

The resulting light modulating devices prepared according to either of the two methods were characterized by measuring the electro-optical response (Test Procedure A) and haze (Test Procedure B).

Test Procedure A

The electro-optical responses of the PDLC devices were characterized using a computer-controlled test stand consisting of an IBM personal computer interfaced with Kepco 125-1KVA-3T power supply, a Dyn-Optics Optical Monitor 590, and a Valhalla Scientific 2300 Series Digital Power Analyzer. The optics of the Dyn-Optics Optical Monitor were adjusted such that the specular transmission of photopically-filter light at an approximate 6° collection half angle was measured relative to an open beam.

A sample of a PDLC film/electrode sandwich measuring several square centimeters was attached to the leads of the power supply using a connector such as that described in the aforementioned Engfer et al. application. A 60 Hz voltage ranging from zero to 120 volts AC (VAC) was applied to the sample in 5 VAC increments and the specular transmission recorded.

Test Procedure B

The haze of the powered (120 VAC, 60 Hz) PDLC devices was measured using a Pacific Scientific Gardner XL-835 Colorimeter according to the manufacturer's instructions.

Example 1

A PDLC device was prepared using the "modifed Miller procedure" described above from a fluid containing (a) 50 parts BL036 liquid crystal mixture (EM Industries, Hawthorne, N.Y.) and (b) 50 parts of the following mixture; 2.5 wt. % Esacure KB-1 photoinitiator (Sartomer, West Chester, Pa.), 20.0 wt. % Vectomer 2020 (Allied Signal Inc., Morristown, N.J.), 5.0 wt. % acrylic acid (Aldrich, Milwaukee, Wis.), 25.0 wt. % isooctyl acrylate, 15.0 wt. % 2-phenoxyethyl acrylate (Sartomer, West Chester, Pa.), 10.0 wt. % trimethylolpropane tris(3-mercaptopropionate) (Aldrich, Milwaukee, Wis.), 11.2 wt. % Uralac 3004–100 (DSM Resins, U.S., Inc., Elgin, Ill.), and 11.2 wt. % cyclohexane dimethanol divinyl ether (International Specialty Products, Wayne, N.J.). The laminate was cured by exposure to UV light (intensity approximately 3.0 mW/cm$^2$) at about 23° C. to produce a PDLC film approximately 21 microns thick.

The PDLC device exhibited on- and off-state transmissions of 72.5% and 0.9% respectively and a haze of 6.4%.

Example 2

A PDLC device was prepared as described in Example 1 from a fluid containing (a) 55 parts BL036 liquid crystal mixture and (b) 45 parts of the following mixture; 2.5 wt. % Esacure KB-1 photoinitiator, 30.1 wt. % 4010-T1995 (made from 0.09 grams KB-1, 2.82 grams T1995 1,1,3,3-tetramethyl-1,3-bis(3-mercaptopropyl)disiloxane (Hüls America, Piscataway, N.J.), 7.24 grams Vectomer 4010 (Allied Signal Inc., Morristown, N.J.), cured approximately 5 minutes at approximately 3 mW/cm$^2$ 365 nm UV light), 7.5 wt. % acrylic acid, 30.0 wt. % isooctyl acrylate, 10.0 wt. % trimethylolpropane tris(3-mercaptopropionate), and 20.0 wt. % hexanediol diacrylate (Sartomer, West Chester, Pa.). The laminate was cured by exposure to UV light (intensity approximately 2.0 mW/cm$^2$) at about 23° C. to produce a PDLC film approximately 19 microns thick.

The PDLC device exhibited on- and off-state transmissions of 74.0% and 1.2% respectively.

Example 3

A PDLC device was prepared as described in Example 1 from a fluid containing (a) 60 parts BL036 liquid crystal mixture and (b) 40 parts of the following mixture; 0.5 wt. % Esacure KB-1 photoinitiator, 0.5 wt. % diphenyl iodonium hexafluorophosphate, 44.6 wt. % Vectomer 4010, 44.6 wt. % hydroxy butyl vinyl ether (International Specialty Products, Wayne, N.J.), and 10.0 wt. % B2405.5 1,3-bis(4-hydroxybutyl)tetramethyldisiloxane (Hüls America, Piscataway, N.J.). The laminate was cured by exposure to UV light (intensity approximately 2.0 mW/cm$^2$) at about 24° C. to produce a PDLC film approximately 15 microns thick.

The PDLC device exhibited on- and off-state transmissions of 75.1% and 9.3% respectively.

Example 4

A PDLC device was prepared as described in Example 1 from a fluid containing (a) 60 parts BL036 liquid crystal mixture and (b) 40 parts of the following mixture; 1.8 wt. % Esacure KB-1 photoinitiator, 27.0 wt. % 2-phenoxyethyl acrylate, 10.0 wt. % Uralac 3004-101 (DSM Resins, U.S., Inc., Elgin, Ill.), 52.2 wt. % Uralac 3004-102(DSM Resins, U.S., Inc., Elgin, Ill.), and 9.0 wt. % Uralac 3004-109 (DSM Resins, U.S., Inc., Elgin, Ill.). The laminate was cured by exposure to UV light (intensity approximately 2.0 mW/cm$^2$) at about 24° C. to produce a PDLC film approximately 21 microns thick.

The PDLC device exhibited on- and off-state transmissions of 64.7% and 1.9% respectively.

Example 5

A PDLC device was prepared as described in Example 1 from a fluid containing (a) 80.8 parts BL036 liquid crystal mixture and (b) 49.8 parts of the following mixture; 0.5 wt. % Esacure KB-1 photoinitiator, 0.4 wt. % diphenyl iodonium hexafluorophosphate, 62.4 wt. % Vectomer 4010, 7.0 wt. % butyl vinyl ether (Aldrich, Milwaukee, Wis.), and 29.8 wt. % octadecyl vinyl ether (BASF Corporation, Parsippany, N.J.). The laminate was cured by exposure to UV light (intensity approximately 2.0 mW/cm$^2$) at about 24° C. to produce a PDLC film approximately 18 microns thick.

The PDLC device exhibited on- and off-state transmissions of 7.2% and 1.1% respectively.

Example 6

A PDLC device was prepared as described in Example 1 from a fluid containing (a) 45 parts BL036 liquid crystal mixture and (b) 55 parts of the following mixture; 1.0 wt. % Esacure KB-1 photoinitiator, 1.0 wt. % triphenyl sulfonium hexafluoroantimonate, 44.4 wt. % Vectomer 2020, 38.7 wt. % divinyl ether of triethylene glycol (International Specialty Products, Wayne, N.J.), and 14.9 wt. % 4-propenyloxymethyl-1,3-2-dioxolanone (PEPC, International Specialty Products, Wayne, N.J.). The laminate was cured by exposure to UV light (intensity approximately 2.0 mW/cm$^2$) at about 22° C. to produce a PDLC film approximately 18 microns thick.

The PDLC device exhibited on- and off-state transmissions of 51.8% and 4.1% respectively.

Example 7

A PDLC device was prepared as described in Example 1 from a fluid containing (a) 45 parts BL036 liquid crystal mixture and (b) 55 parts of the following mixture; 2.5 wt. % Esacure KB-1 photoinitiator, 25.0% Vectomer 2010 (Allied Signal Inc., Morristown, N.J.), 7.5 wt. % acrylic acid, 15.0 wt. % isooctyl acrylate, 10.0 wt. % trimethylolpropane tris(3-mercaptopropionate), and 39.9 wt. % Uralac 3004-102. The laminate was cured by exposure to UV light (intensity approximately 2.0 mW/cm$^2$) at about 23° C. to produce a PDLC film approximately 20 microns thick.

The PDLC device exhibited on- and off-state transmissions of 73.1% and 1.4% respectively.

Example 8

A PDLC device was prepared as described in Example 1 from a mixture containing (a) 60 parts BL036 liquid crystal mixture and (b) 40 parts of the following mixture; 2.5 wt. % Esacure KB-1 photoinitiator, 7.5 wt. % acrylic acid, 20.0 wt. % isooctyl acrylate, and 70.0 wt. % Vectomer 4020 (Allied Signal Inc., Morristown, N.J.). The laminate was cured by exposure to UV light (intensity approximately 2.0 mW/cm$^2$) at about 23° C. to produce a PDLC film approximately 15 microns thick.

The PDLC device exhibited on- and off-state transmissions of 73.2% and 2.8% respectively.

Example 9

A PDLC device was prepared as described in Example 1 from a fluid containing (a) 27.2 parts BL036 liquid crystal mixture and (b) 25.0 parts of the following mixture; 2.5 wt. % Esacure KB-1 photoinitiator, 22.4 wt. % isooctyl acrylate, 19.7 wt. % 2-phenoxyethyl acrylate, 10.5 wt. % $C_8F_{17}SO_2N$ $(C_2H_5)CH_2CH_2OCH=CH_2$, 14.9 wt. % Uralac 3004-102, and 30.0 wt. % Uralac 3004-300 (DSM Resins, U.S., Inc., Elgin, Ill.). The laminate was cured by exposure to UV light (intensity approximately 2.0 mW/cm$^2$) at about 24° C. to produce a PDLC film approximately 11 microns thick.

The PDLC device exhibited on- and off-state transmissions of 75.4% and 2.0% respectively.

Example 10

A PDLC device was prepared by placing a few drops of an unpolymerized fluid containing (a) 22.7 parts BL036 liquid crystal mixture and (b) 23.4 parts of the following mixture; 0.2 wt. % Esacure KB-1 photoinitiator, 2.9 wt. % isooctyl acrylate, 42.7 wt. % PS927 poly(mercaptopropyl) methylsiloxane (Hüls America, Piscataway, N.J.), and 54.2 wt. % Vectomer 4010 near the center of the conductive side of a piece of ITO-coated glass measuring approximately 5 cm×6.4 cm. A square ring of PET film measuring approximately 5 cm×5 cm×0.6 cm (prepared by first cutting a piece of PET measuring 5 cm×5 cm from a 0.0025 cm thick piece of PET, followed by cutting a 3.8×3.8 square from the center of the 5 cm×5 cm piece) was placed on top of the ITO-coated glass. A second piece of ITO-coated glass with the conductive side facing the uncured matrix/liquid crystal mixture was laid on top of the first ITO-coated glass piece at an approximately 90° orientation angle to the first piece. Manual pressure was applied to distribute the unpolymerized mixture between the glass pieces. The laminate was then cured by exposure to UV light (intensity approximately 0.5 mW/cm$^2$) at room temperature to produce a PDLC device.

The PDLC device exhibited on- and off-state transmissions of 46.1% and 0.8% respectively.

Example 11

A PDLC device was prepared according to Example 10 from a fluid containing (a) 27.7 parts BL036 liquid crystal mixture and (b) 26.0 parts of the following mixture; 0.6 wt. % Esacure KB-1 photoinitiator, 57.3 wt. % trimethylolpropane tris(3-mercaptopropionate), and 42.1 wt. % cyclohexane dimethanol divinyl ether. The laminate was cured by exposure to UV light (intensity approximately 0.5 mW/cm$^2$) at room temperature to produce a PDLC device.

The PDLC device exhibited on- and off-state transmissions of 60.0% and 1.6% respectively.

Example 12

A PDLC device was prepared as described in the precision coating method above from a fluid containing (a) 55 parts of a mixture consisting of 30.0 wt. % RCC15C curable matrix mixture obtained without initiator and with 50% less thiol (W.R. Grace, Atlanta, Ga.), 7.5 wt. % acrylic acid, 30.0 wt. % isooctyl acrylate, 15.0 wt. % 2-phenoxyethyl acrylate, 15.0 wt. % divinyl ether of triethylene glycol, and 2.5 wt. % KB-1 photoinitiator, and (b) 45 parts BL036 liquid crystal mixture having a solution viscosity of 42 cps (measured on a Brookfield viscometer using a #3 spindle operating at 60 rpm). The fluid, which was degassed under vacuum for approximately 2 minutes at ambient temperature, was applied as a 15.2 cm (6 inch) wide strip to the electrode surface of an ITO-coated polyester film (90/10 indium/tin ratio, 80 ohms/square, 51 microns (2 mil) thick PET, available from Southwall Technologies, Palo Alto, Calif.) at a rate of approximately 152.4 cm/min (5 ft/minute) using an 88.9 cm die similar to that illustrated in FIG. 4 which was deckled to produce a narrower coating and configured with a 152 micron shim, a coating land having a length ($L_1$) of 12.7 mm, a vacuum land having a length $L_2$ of 12.7 mm, a 0.57° convergence, a 33 micron overbite, a vacuum land gap $G_2$ of 0.152 mm, a die attack angle $A_2$ of 95°, and a coating gap of 102 microns. The convergence of the vacuum bar was 0° and no vacuum was applied to the vacuum chamber during coating. Both the die and back-up roll were temperature controlled at 21° C. A pressure of 1.7 bar was maintained to the sintered metal bar during lamination and the lamination bar was adjusted to provide an interference of 3.6 mm. The resulting laminate was cured by exposure to UV light (intensity approximately 1.1 mW/cm$^2$) at about 21° C. to produce a PDLC film approximately 24±1 microns thick.

The PDLC device had on- and off-state transmissions of 73.1% and 1.2%, respectively, and a haze of 5.8%.

Example 13

A PDLC device was prepared as described in Example 12 except that the fluid contained (a) 125 parts of BL036 liquid crystal mixture and (b) 125 parts of the following mixture; 2.5 wt. % Esacure KB-1 photoinitiator, 7.5 wt. % methacrylic acid (Aldrich, Milwaukee, Wis.), 10.0 wt. % isooctyl acrylate, 15.0 wt. % lauryl methacrylate (Rohm Tech, Inc., Malden, Mass.), 20.0 wt. % 2-phenoxyethyl acrylate, 15.0 wt. % Uralac 3004-102, and 30.0 wt. % Vectomer 4020. The die was configured with an overbite of 48 microns. An air pressure of 2.4 bar was maintained to the lamination bar which was adjusted to provide an interference of 4.1 mm. The resulting laminate was cured by exposure to UV light (intensity approximately 2.02 mW/cm$^2$) at about 22° C. to produce a PDLC film approximately 22–23 microns thick.

The PDLC device had on- and off-state transmissions of 72.2% and 1.2%, respectively, and a haze of 7.1%.

Example 14

A PDLC device was prepared as described in Example 12 except that the fluid contained (a) 112.5 parts of BL036 liquid crystal mixture and (b) 137.5 parts of the following mixture; 2.5 wt. % Esacure KB-1 photoinitiator, 5.0 wt. % acrylic acid, 22.5 wt. % isooctyl acrylate, 10.0 wt. % trimethylolpropane tris(3-mercaptopropionate), 30.0 wt. % Uralac 3004-102, and 30.0 wt. % Uralac 3004-300. The die was configured with an overbite of 43 microns and a vacuum of 1.9 mm Hg was applied to the vacuum chamber during coating. An air pressure of 2.4 bar was maintained to the laminator bar which was adjusted to provide an interference of 4.1 mm. The resulting laminate was cured by exposure to UV light (intensity approximately 2.02 mW/cm$^2$) at about 23° C. to produce a PDLC film approximately 33 microns thick.

The PDLC device had on- and off-state transmissions of 72.9% and 1.5%, respectively, and a haze of 6.6%.

Example 15

A PDLC device was prepared as described in Example 12 except that the fluid contained (a) 150 parts of BL036 liquid crystal mixture and (b) 100 parts of the following mixture; 2.5 wt. % Esacure KB-1 photoinitiator, 7.5 wt. % methacrylic acid, 30.0 wt. % isooctyl acrylate, 15.0 wt. % 2-phenoxyethyl acrylate, 15.0 wt. % Uralac 3004-102, and 30.0 wt. % Vectomer 4010. The die was configured with an overbite of 18 microns and a vacuum of 3.7 mm Hg was maintained to the vacuum chamber during coating. An air pressure of 2.4 bar was maintained to the laminator bar which was adjusted to provide and interference of 4.1 mm. The resulting laminate was cured by exposure to UV light (intensity approximately 1.99 mW/cm$^2$) at about 21° C. to produce a PDLC film 18 microns thick.

The PDLC device had on- and off-state transmissions of 71.1% and 1.7%, respectively, and a haze of 7.9%.

Example 16

A PDLC device was prepared as described in Example 12 except that the fluid contained (a) 135 parts of BL036 liquid crystal mixture and (b) 165 parts of the following mixture; 2.5 wt. % Esacure KB-1 photoinitiator, 25.0 wt. % Vectomer 2010, 7.5 wt. % acrylic acid, 15.0 wt. % isooctyl acrylate, 10.0 wt. % trimethylolpropane tris(3-mercaptopropionate), and 40.0 wt. % Uralac 3004-102. The die was configured with an overbite of 41 microns and a coating gap of 71 microns. A vacuum of 4.3 mm Hg was applied to the vacuum chamber during coating which was carried out at 29° C. and a speed of approximately 0.9 meters per minute. An air pressure of 2.4 bar was maintained to the laminator bar which was adjusted to provide an interference of 3.1 mm. The resulting laminate was cured by exposure to UV light (intensity approximately 2.01 mW/cm$^2$) at about 21° C. to produce a PDLC film approximately 30 microns thick.

The device had on- and off-state transmissions of 72.6% and 1.2%, respectively, and a haze of 5.8%.

Example 17

A PDLC device was prepared as described in Example 12 except that the fluid contained (a) 135 parts of BL036 liquid crystal mixture and (b) 165 parts of the following mixture; 2.5 wt. % Esacure KB-1 photoinitiator, 10.0 wt. % Vectomer 2020, 7.5 wt. % acrylic acid, 17.5 wt. % isooctyl acrylate, 12.5 wt. % 2-phenoxyethyl acrylate, 10.0 wt. % trimethylolpropane tris(3-mercaptopropionate), and 40.0 wt. % Uralac 3004-102. The die was configured with an overbite of 25 microns and a coating gap of 76 microns. The die temperature was maintained at 26.4° C. and a vacuum of 0.9 mm Hg was applied to the vacuum chamber during coating. An air pressure of 2.4 bar was maintained to the laminator bar which was adjusted to provide an interference of 3.1 mm. The resulting laminate was cured by exposure to UV light (intensity approximately 2.0 mW/cm$^2$) at about 25° C. to produce a PDLC film approximately 28–29 microns thick.

The PDLC device had on- and off-state transmissions of 73.9% and 1.2%, respectively, and a haze of 5%.

Example 18

A PDLC device was prepared as described in Example 12 except that the coating fluid had the following composition: (a) 50 parts of a mixture consisting of 20.0 wt. % Vectomer 2020, 5.0 wt. % acrylic acid, 25.0 wt. % isooctyl acrylate, 15.0 wt. % 2-phenoxyethyl acrylate, 10 wt. % trimethylolpropane tris(3-mercaptopropionate), 22.5 wt. % cyclohexane dimethanol divinyl ether, and 2.5 wt. % Escacure KB-1, and (b) 50 parts BL036 liquid crystal mixture. The viscosity of the coating fluid was 134 cps (measured on a Brookfield viscometer using a #3 spindle operating at 60 rpm). The coating temperature was 21° C. and during lamination an air pressure of 2.4 bar was maintained to the laminator bar which was adjusted to provide an interference of 3.8 mm. The fluid was applied as a 15.2 cm (6 inch) wide strip to the electrode surface of an ITO-coated polyester film at a rate of approximately 152.4 cm/min (5 ft/minute) using the precision coating process described in Example 7 except that a 46 micron overbite, a coating gap of 102 microns, and a vacuum of 1.9 mm Hg (1 inch of water) was used to apply the solution at 2220 C. The film was cured at 21° C. by exposing each side to approximately 530 mJ/cm$^2$ at an intensity of 1.0 mW/cm$^2$ to produce a PDLC film with a thickness of 23±1 microns.

The PDLC device had on- and off-state transmissions of 71.9% and 1.1%, respectively, and a haze of 4.8%.

Example 19

A PDLC device was prepared as described in Example 12 except that the fluid contained (a) 220 parts of BL036 liquid crystal mixture and (b) 180 parts of the following mixture; 2.5 wt. % Esacure KB-1 photoinitiator, 30.0 wt. % 9460 allyl aliphatic urethane (Monomer-Polymer & Dajac, Trevose, Pa.), 7.5 wt. % acrylic acid, 25.0 wt. % isooctyl acrylate, 20.0 wt. % 2-phenoxyethyl acrylate, and 15.0 wt. % Uralac 3004-102. The die was configured with an overbite of 51 microns and a coating gap set at 76 microns. A vacuum of 0.9 mm Hg was applied to the vacuum chamber during coating. An air pressure of 1.7 bar was maintained to the laminator bar which was adjusted to provide an interference of 3.8 mm. The resulting laminate was cured by exposure to UV light (intensity approximately 1.9 mW/cm$^2$) at about 22° C. to produce a PDLC film approximately 13–14 microns thick.

The PDLC device had on- and off-state transmissions of 73.8% and 1.2%, respectively, and a haze of 4.8%.

Example 20

A PDLC device was prepared as described in Example 12 except that the fluid contained (a) 333 parts of BL036 liquid crystal mixture and (b) 267 parts of the following mixture; 2.5 wt. % Esacure KB-1 photoinitiator, 20.0 wt. % 9460 allyl aliphatic urethane, 5.0 wt. % acrylic acid, 30.0 wt. % isooctyl acrylate, 20.0 wt. % 2-phenoxyethyl acrylate, and 22.5 wt. % Uralac 3004-102. The die was configured with an overbite of 41 microns. A vacuum of 1.9 mm Hg was applied to the vacuum chamber during coating. An air pressure of 3.4 bar was maintained to the laminator bar which was adjusted to provide an interference of 3.8 mm. The resulting laminate was cured by exposure to UV light (intensity approximately 1.8 mW/cm$^2$) at about 21° C. to produce a PDLC film approximately 15 microns thick.

The PDLC device had on- and off-state transmissions of 74.8% and 1.2%, respectively, and a haze of 4.7%.

Example 21

A PDLC device was prepared as described in Example 12 except that the fluid contained (a) 655 parts of BL036 liquid crystal mixture and (b) 516 parts of the following mixture; 2.5 wt. % Esacure KB-1 photoinitiator, 20.0 wt. % Vectomer 2020, 5.0 wt. % acrylic acid, 35.0 wt. % isooctyl acrylate, 15.0 wt. % 2-phenoxyethyl acrylate, 5.0 wt. % diethyl fumarate (Aldrich, Milwaukee, Wis.), and 17.5 wt. % Uralac 3004-102. The die was configured to coat an 88.9 cm wide strip, with an overbite of 41 microns and a vacuum of 1.9 mm Hg was applied to the vacuum chamber during coating. An air pressure of 1.7 bar was maintained to the laminator bar which was adjusted to provide an interference of 6.35 mm. The resulting laminate was cured by exposure to UV light (intensity approximately 1.54 mW/cm$^2$) at about 20° C. to produce a PDLC film approximately 14–15 microns thick.

The PDLC device had on- and off-state transmissions of 73.4% and 1.1%, respectively, and a haze of 4.5%.

Example 22

A PDLC device was prepared as described in Example 21 except that the fluid contained 500 parts of BL036 liquid crystal mixture and 333 parts of a mixture having the composition of 2.5 wt. % Esacure KB-1 photoinitiator, 7.5 wt. % acrylic acid, 30.0 wt. % isooctyl acrylate, 15.0 wt. % 2-phenoxyethyl acrylate 15.0 wt. % Uralac 3004-102, and 30.0 wt. % Uralac 3004-300. The die was configured with an overbite of 43 microns, a vacuum land gap $G_2$ of 24.5 mm and a vacuum of 1.9 mm Hg was applied to the vacuum chamber during coating. The ITO-coated polyester film used for the electrodes was approximately 130 microns (5 mils) thick. An air pressure of 3.4 bar was maintained to the laminator bar which was adjusted to provide an interference of 6.4 mm. The resulting laminate was exposed to UV light having an average intensity of approximately 1.68 mW/cm$^2$ at about 23° C. to produce a PDLC film approximately 18 microns thick.

The PDLC device had on- and off-state transmissions of 73.4% and 1.7%, respectively, and a haze of 5.3%.

Example 23

A PDLC device was prepared as described in Example 12 using a fluid containing (a) 45 parts of a mixture consisting of 20.0 wt. % of the oligomer contained in RCC-15C (W.R. Grace, Atlanta, Ga.), 2.5 wt. % acrylic acid, 40.0 wt. % isooctyl acrylate, 25.0 wt. % 2-phenoxyethyl acrylate, 10.0 wt. % Uralac 3004-102, and 2.5 wt. % KB-1 photoinitiator, and (b) 55 parts BL036 liquid crystal mixture having a solution viscosity of 42 cps (measured on a Brookfield viscometer using a #3 spindle operating at 60 rpm). The fluid was applied to the electrode substrate at a rate of approximately 4.6 m/min using a die configured with a 3.8 micron overbite. A vacuum of 3.7 mm Hg was applied to the vacuum chamber during coating. Both the die and back-up roll were temperature controlled at 20° C. A pressure of 3.4 bar was maintained to the sintered metal bar during lamination and the lamination bar was adjusted to provide an interference of 3.8 mm. The laminate was cured at 21° C. by exposure to 244 mJ/cm$^2$ UV light at an average intensity of approximately 2.0 mW/cm$^2$ to produce a PDLC film approximately 19 microns thick.

The PDLC device had on- and off-state transmissions of 74.3% and 1.0%, respectively, and a haze of 4.0%.

Other embodiments are within the following claims.

What is claimed is:

1. An optically responsive film comprising liquid crystal dispersed in a crosslinked polymer matrix comprising the reaction product of an isotropic polymerizable mixture that includes at least one multi-functional vinyl ether, said vinyl ether having two or more polymerizable carbon-carbon double bonds, each of which is linked via a single bond to an oxygen atom where the other group bonded to the oxygen atom is neither a carbonyl group nor a hydrogen atom.

2. The optically responsive film of claim 1 wherein said film comprises the reaction product of said multi-functional vinyl ether and at least one mono-functional vinyl ether.

3. The optically responsive film of claim 1 wherein said film comprises the reaction product of said multi-functional vinyl ether and at least one multi-functional reactant other than a vinyl ether.

4. The optically responsive film of claim 3 wherein said multi-functional reactant other than a vinyl ether, comprises a thiol, ene, silicon hydride, alcohol, epoxy, or combination thereof.

5. The optically responsive film of claim 1 wherein said vinyl ether comprises 1,4-cyclohexanedimethanol divinyl ether.

6. The optically responsive film of claim 1 wherein said vinyl ether comprises triethylene glycol divinyl ether.

7. The optically responsive film of claim 1 wherein said vinyl ether comprises a vinyl ether-functional urethane oligomer.

8. The optically responsive film of claim 1 wherein said film comprises the reaction product of said vinyl ether and at least one copolymerizable reactant provided with one or more groups classified as Lewis acids.

9. The optically responsive film of claim 8 wherein said copolymerizable reactant comprises acrylic acid, methacrylic acid, or a combination thereof.

10. The optically responsive film of claim 1 wherein said film comprises the reaction product of said multi-functional vinyl ether and a maleate, fumarate, or a combination thereof.

11. An optically responsive film comprising liquid crystal dispersed in a crosslinked polymer matrix comprising the reaction product of an isotropic polymerizable mixture that includes at least one vinyl ether and at least one multi-functional reactant other than a vinyl ether, said vinyl ether having one or more polymerizable carbon-carbon double bonds, each of which is linked via a single bond to an oxygen atom where the other group bonded to the oxygen atom is neither a carbonyl group nor a hydrogen atom, and being selected from the group consisting of butanediol divinyl ether, 1,4-cyclohexanedimethanol divinyl ether, the propenyl ether of propylene carbonate, and triethylene glycol divinyl ether.

12. An optically responsive film comprising liquid crystal dispersed in a crosslinked matrix comprising the reaction product of an isotropic polymerizable mixture that includes at least one vinyl ether and at least one multi-functional reactant other than a vinyl ether, said vinyl ether having one or more polymerizable carbon-carbon double bonds, each of which is linked via a single bond to an oxygen atom where the other group bonded to the oxygen atom is neither a carbonyl group nor a hydrogen atom, and being selected from the group consisting of 1,4-cyclohexanedimethanol monovinyl ether or esters thereof, a vinyl ether-functional urethane oligomer, and a fluorinated vinyl ether.

13. An optically responsive film comprising liquid crystal dispersed in a crosslinked polymer matrix comprising the reaction product of an isotropic polymerizable mixture that includes at least one vinyl ether, at least one multi-functional reactant other than a vinyl ether, and a maleate, fumarate, or combination thereof, said vinyl ether having one or more polymerizable carbon-carbon double bonds, each of which is linked via a single bond to an oxygen atom where the other group bonded to the oxygen atom is neither a carbonyl group nor a hydrogen atom.

14. An optically responsive film comprising liquid crystal dispersed in a crosslinked polymer matrix comprising the reaction product of an isotropic polymerizable mixture that includes at least one vinyl ether, at least one multi-functional reactant other than a vinyl ether, and at least one copolymerizable reactant provided with one or more groups classified as Lewis acids, said vinyl ether having one or more polymerizable carbon-carbon double bonds, each of which is linked via a single bond to an oxygen atom where the other group bonded to the oxygen atom is neither a carbonyl group nor a hydrogen atom.

15. The optically responsive film of claim 14 wherein said copolymerizable reactant comprises acrylic acid, methacrylic acid, or a combination thereof.

16. A method of preparing an optically responsive film comprising the steps of:

(a) combining liquid crystal, at least one vinyl ether, and at least one mono-functional reactant other than a vinyl ether to form an isotropic mixture, said vinyl ether having one or more polymerizable carbon-carbon double bonds, each of which is linked via a single bond to an oxygen atom where the other group bonded to the oxygen atom is neither a carbonyl group nor a hydrogen atom; and (b) polymerizing said vinyl ether and said mono-functional reactant in the presence of said liquid crystal to cause phase separation of said liquid crystal and thereby form an optically responsive film comprising liquid crystal dispersed in a crosslinked polymer matrix.

17. A method of preparing an optically responsive film comprising the steps of:

(a) combining liquid crystal, at least one vinyl ether, and a copolymerizable reactant provided with one or more groups classified as Lewis acids comprising acrylic acid, methacrylic acid, or a combination thereof to form an isotropic mixture, said vinyl ether having one or more polymerizable carbon-carbon double bonds, each of which is linked via a single bond to an oxygen atom where the other group bonded to the oxygen atom is neither a carbonyl group nor a hydrogen atom; and (b) polymerizing said vinyl ether and said copolymerizable reactant in the presence of said liquid crystal to cause phase separation of said liquid crystal and thereby form an optically responsive film comprising liquid crystal dispersed in a crosslinked polymer matrix.

18. A method of preparing an optically responsive film comprising the steps of:

(a) combining liquid crystal, at least one vinyl ether, and a maleate, fumarate, or combination thereof to form an isotropic mixture, said vinyl ether having one or more polymerizable carbon-carbon double bonds, each of which is linked via a single bond to an oxygen atom where the other group bonded to the oxygen atom is neither a carbonyl group nor a hydrogen atom; and (b) polymerizing said vinyl ether and said maleate, fumarate, or combination thereof in the presence of said liquid crystal to cause phase separation of said liquid crystal and thereby form an optically responsive film comprising liquid crystal dispersed in a crosslinked polymer matrix.

* * * * *